(12) United States Patent
Engel

(10) Patent No.: US 6,935,771 B2
(45) Date of Patent: Aug. 30, 2005

(54) MIXER SEAL AND BEARING APPARATUS AND METHOD

(75) Inventor: David J. Engel, Springwater, NY (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/738,995

(22) Filed: Dec. 19, 2003

(65) Prior Publication Data

US 2004/0130966 A1 Jul. 8, 2004

Related U.S. Application Data

(62) Division of application No. 09/873,209, filed on Jun. 5, 2001, now abandoned.

(51) Int. Cl.$^7$ ............................................... B01F 15/00
(52) U.S. Cl. ....................................................... 366/331
(58) Field of Search ................................ 366/262, 270, 366/331; 277/359, 408, 930; 464/178; 416/174; 384/548, 559, 561, 562, 569, 584, 585

(56) References Cited

U.S. PATENT DOCUMENTS

| 2,034,545 | A |   | 3/1936  | Umstattd |          |
|-----------|---|---|---------|----------|----------|
| 2,332,684 | A |   | 10/1943 | Armitage |          |
| 2,627,171 | A |   | 2/1953  | Brumagim |          |
| 2,867,997 | A |   | 1/1959  | Lake     |          |
| 3,606,260 | A |   | 9/1971  | Rubin    |          |
| 3,887,169 | A |   | 6/1975  | Maynard  |          |
| 4,198,373 | A | * | 4/1980  | Kropp et al. | 422/49 |
| 4,272,084 | A |   | 6/1981  | Martinson et al. |      |
| 4,383,768 | A | * | 5/1983  | Kupka    | 366/279  |
| 4,419,015 | A | * | 12/1983 | Liddiard | 366/349  |
| 4,424,840 | A |   | 1/1984  | Pousette et al. |       |
| 4,587,076 | A |   | 5/1986  | Bonhomme |          |
| 4,721,311 | A |   | 1/1988  | Kakabaker |         |
| 4,813,786 | A |   | 3/1989  | LeMaster |          |
| 5,368,390 | A |   | 11/1994 | Gambrill et al. |      |
| 5,568,975 | A |   | 10/1996 | Blakley et al. |       |
| 5,667,313 | A |   | 9/1997  | Kapaan et al. |        |
| 5,690,341 | A | * | 11/1997 | Prough et al. | 277/511 |
| 5,876,127 | A |   | 3/1999  | Casey    |          |
| 6,293,704 | B1 |  | 9/2001  | Gradu    |          |
| 6,296,254 | B1 |  | 10/2001 | Young    |          |
| 6,327,773 | B1 |  | 12/2001 | Rode     |          |
| 6,715,913 | B2 | * | 4/2004 | Engel    | 366/331  |
| 2003/0081500 | A1 | * | 5/2003 | Engel | 366/331 |

FOREIGN PATENT DOCUMENTS

| DE | 2445739 A1 | * | 4/1975 |
| EP | 222933     |   | 5/1987 |
| JP | 2002-66295 | * | 3/2004 |

* cited by examiner

*Primary Examiner*—Charles E. Cooley
(74) *Attorney, Agent, or Firm*—Baker & Hostetler LLP

(57) ABSTRACT

An assembly for supporting a mixer shaft in an opening in a vessel wall has a support mounted to the vessel wall around the opening and a seal ring supported by the support that engages a circumference of the mixer shaft with a sealing contact. A first bearing is mounted to the support that surrounds and supports the mixer shaft at one axial location thereof and a second bearing is mounted to the support that surrounds and supports the mixer shaft at a second axial location thereof.

9 Claims, 3 Drawing Sheets

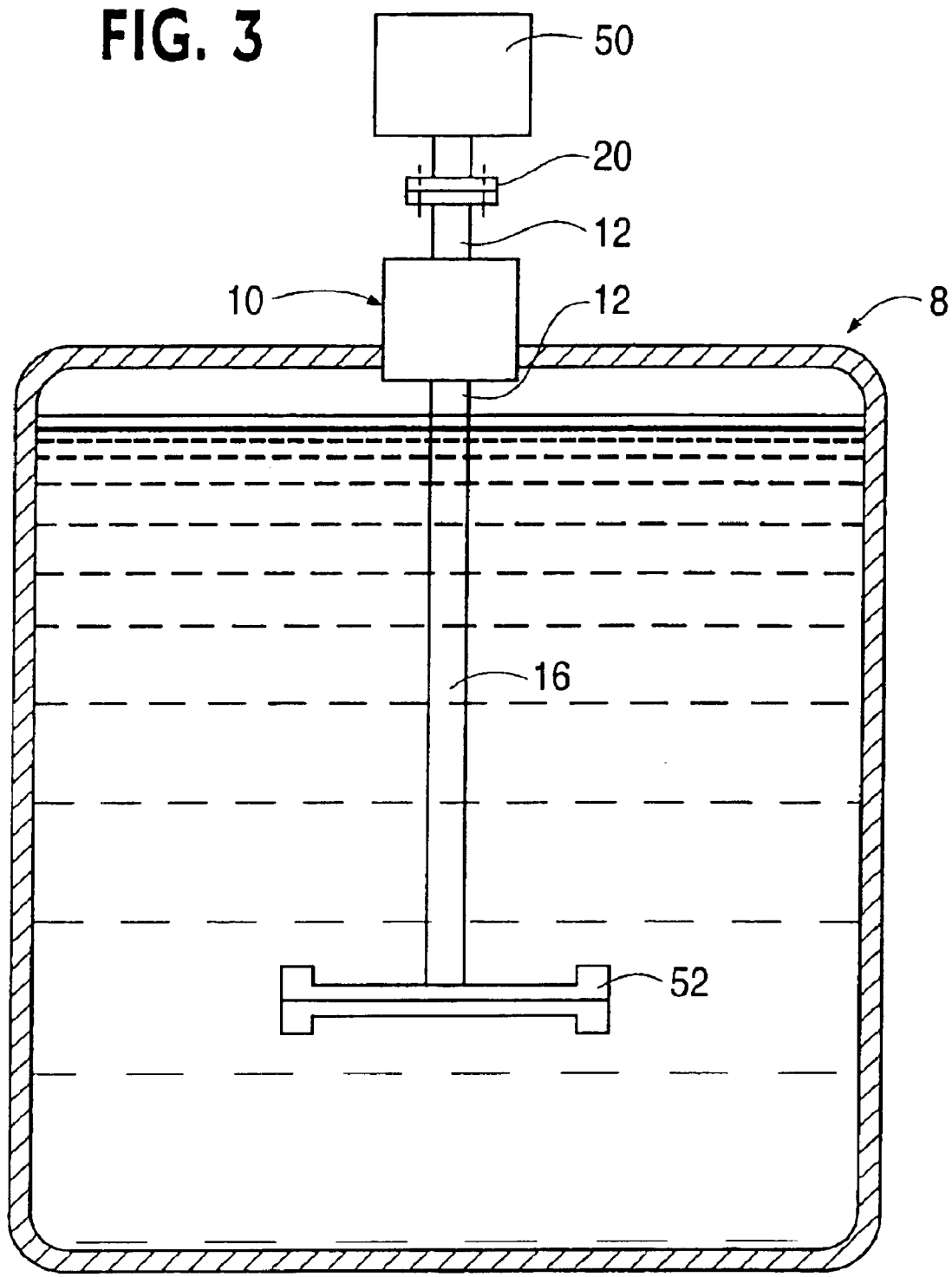

MIXER SEAL AND BEARING APPARATUS AND METHOD

This application is a divisional, and claims the benefit of U.S. patent application Ser. No. 09/873,209, filed Jun. 5, 2001 entitled Mixer Seal and Bearing Apparatus and Method, now abandoned, the disclosure of which is incorporated herein by reference.

FIELD OF THE INVENTION

The present invention relates generally to support of shafts for mixers such as mixing systems having closed vessels. Various mixing vessels are in wide use in the chemical, petroleum, pharmaceutical, cosmetic, food preparation and other industries.

More particularly, the invention relates to assemblies and methods that provide a bearing support to a driven mixer shaft and also provide a seal so that material inside the mixing vessel does not escape around the mixer shaft.

BACKGROUND OF THE INVENTION

In industrial mixing applications, it has been known to use vessels having a driven shaft entering through an opening in the top of the vessel to drive an impeller in the vessel attached to the lower parts of the driven shaft. In some applications, the top of the mixer shaft terminates in a flange connection. A drive assembly including a motor has a drive shaft connected via flanges to the mixer shaft.

Where the mixer shaft enters through the top wall of the vessel, it has been known to provide an assembly that includes a sealing ring around the mixer shaft that prevents material inside the vessel from escaping around the entrance area of the mixer shaft. It has also been known in such as assembly to provide a single ball bearing support ring generally near the sealing ring and above the sealing ring that reacts to radial and axial loads on the shaft, and thus fixes the shaft radially and axially at the point of location of the ball bearing ring.

A disadvantage of one known arrangement is that the employment of a single ball bearing support in some instances does not fully handle the various types of reaction loads that may be present in the shaft. For example, mixing shafts are often subjected to various tilting and bending loads along various points of the mixer shaft length. If these loads are not properly accommodated for, undesirable angular bending or misalignment may occur below the single ball bearing ring, in the vicinity near the seal ring, hindering the effectiveness and/or life of the sealing ring. Moreover, bending may also occur above the single ball bearing ring, at the top of the mixing shaft, thus transmitting undesirable bending and/or loads to the drive shaft coupled thereto.

In view of the foregoing, there is a need in the art for an improved seal and bearing assembly and method that can react to bending loads and/or provide improved radial and axial load handling capability.

SUMMARY OF THE INVENTION

It is an object of the invention to provide an improved seal and bearing assembly and method that can react to bending loads and/or provide improved radial and axial load handling capability.

In one aspect, the invention provides an assembly for supporting a mixer shaft in an opening in a vessel wall. The assembly comprises a support mounted to the vessel wall around the opening and a seal ring supported by the support that engages a circumference of the mixer shaft with a sealing contact. A first bearing is mounted to the support and surrounds and supports the mixer shaft at one axial location thereof. A second bearing is also mounted to the support and surrounds and supports the mixer shaft at a second axial location thereof.

In another aspect, the first bearing is a first tapered roller bearing and the second bearing is a second tapered roller bearing. The first and second roller bearings are canted in opposite directions relative to the shaft. In some embodiments, the bearings may be at angles of equal magnitude relative to the axis of the supported shaft.

In yet another aspect, the invention also provides an assembly for supporting a mixer shaft in an opening in a vessel wall. The assembly comprises supporting means mounted through the vessel wall around the opening and sealing means supported by the supporting means. The sealing means engages a circumference of the mixer shaft with a sealing contact. First and second bearing means which are located at first and second axial locations in the mixer shaft are provided. The bearing means are supported by the supporting means, and surround and supports the mixer shaft.

In still another aspect, a method is provided for supporting a mixer shaft in an opening in a vessel wall, which comprises the steps of sealing around the circumference of the mixer shaft at a first location of the mixer shaft to prevent material from escaping the vessel around the shaft, and supporting the mixer shaft at at least second and third locations along the length of the mixer shaft to resist axial, radial, and bending loads on the shaft at the second and third locations.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 is a schematic view of a bearing and seal assembly according to FIG. 1 installed with a mixing vessel.

DETAILED DESCRIPTION OF THE PREFERRED EMBODIMENTS

The present invention provides an improved method and assembly having a seal for sealing around a mixer shaft and bearings for supporting the mixer shaft. The invention is suitable for use to support shafts for a variety of mixer types such as mixing systems having closed vessels. Accordingly, the invention may be used, for example, in various mixing vessels that are in wide use in the chemical, petroleum, pharmaceutical, cosmetic, food preparation and other industries.

Figure 1:
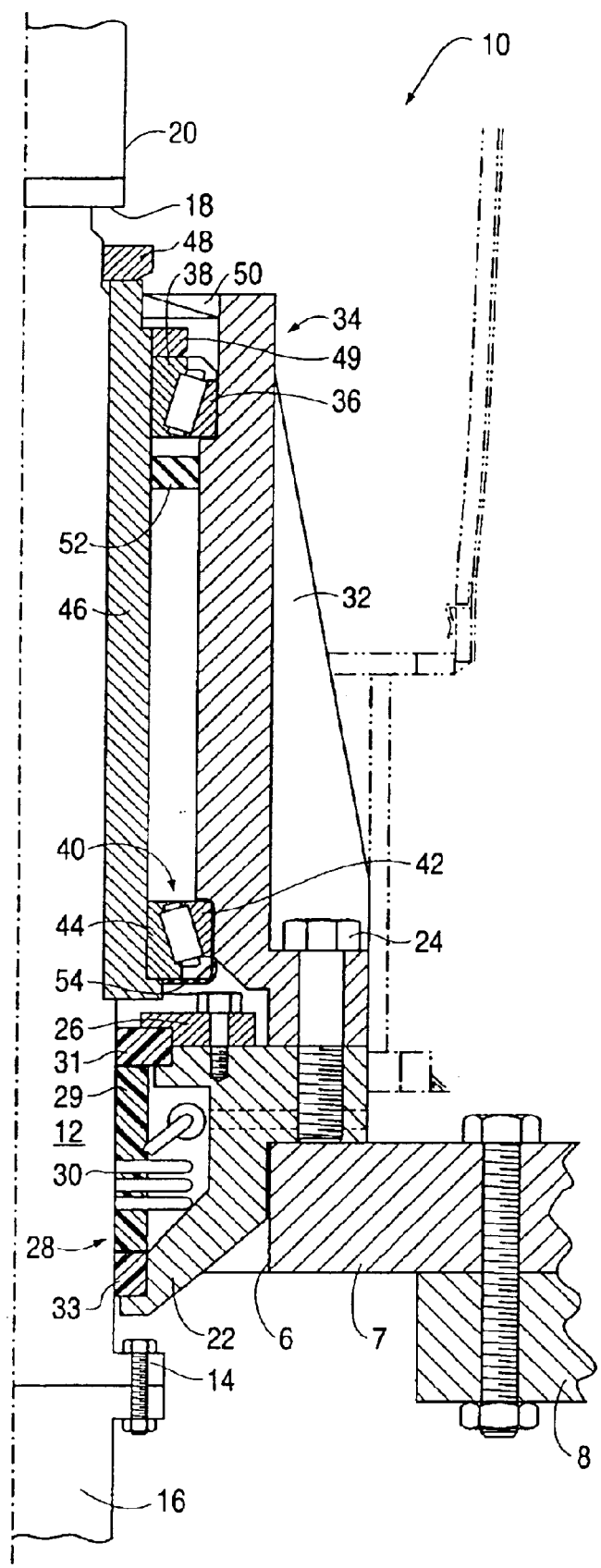
FIG. 1 is a cross sectional view of a bearing and seal assembly according to a preferred embodiment of the invention.

More specifically, referring to the preferred embodiment shown in FIG. 1, the assembly 10 is mounted in a mixer flange opening 6 which is an opening in a mixer mounting flange 7 attached to the tank flange on the top of the mixer vessel 8. The assembly 10 supports a mixer shaft 12 which has a lower flange 14 as shown. The lower flange 14 may connect to an impeller shaft 16 which extends into the mixer vessel 8 and which may support blades or impellers that operate within the mixer vessel 8. At its top end, the mixer shaft 12 is attached to a coupling 18 that can be attached to a motor-driven drive shaft 20 as shown. The coupling 18 is a suitable flexible coupling to accommodate any misalignments, and is illustrated schematically.

By virtue of the upper and lower connections being detachable as illustrated, it will be appreciated that the bearing and seal assembly 10 can be removed as a unit or cartridge for replacement and/or repair, while preserving the original drive shaft 20, impeller shaft 16, and mixer vessel 8.

The seal and bearing assembly 10 has a seal housing base 22 that can be bolted to the flange opening 6 by a suitable bolt or fastener 24. A seal housing top 26 is fastened to the seal housing base 22 so as to retain an upper stationary sealing ring 31 as shown. The upper stationary sealing ring 31 is part of a seal assembly 28 that may be a known conventional seal such as a cylindrical polymer axial face seal.

The primary function of the seal assembly 28 is to prevent material inside the mixer from escaping around the circumference of the shaft. The seal assembly 28 includes a stationary upper stationary sealing ring 31 held by the seal housing top 26. A rotating seal element 29 is mounted on the shaft 12 and rotates with the shaft 12. A lower seal element 33 is held by the seal housing 22 and is stationary. There is a sliding contact of the lower face of the rotating seal element 29 with the upper face of the lower stationary sealing ring 33. This sliding contact primarily prevents material from escaping the tank. Sliding contact between the upper face of the rotating seal element 29 and the lower face of the upper stationary sealing ring 31 primarily retains the bearing lubricating material.

A coolant coil line 30 may be mounted to the seal housing 22 and wrapped as a coil around the seal assembly 28 to provide cooling and dissipate heat generated by the frictional contact of the upper and lower faces of the rotating seal element 29 with the stationary faces of the stationary sealing ring 31.

An outer bearing housing 32 is fastened to the seal housing base 22 by the bolt 24. The outer bearing housing 32 is connected to and retains an upper bearing 34 having an outer race 36 and an inner race 38. The outer bearing housing 32 is also connected to a lower bearing 40 having an outer race 42 and an inner race 44 as shown. The outer bearing housing 32 is thus fixed in relation to the mixing vessel flange 10 and does not rotate.

The inner races 38 and 44 are mounted to and retained by an inner bearing housing 46, also referred to as a quill shaft, that is connected to the mixer shaft 12 to rotate with the mixer shaft 12. The inner bearing housing 46 may be rigidly affixed to the mixer shaft 12, or may slide onto the mixer shaft 12 with a close clearance fit, so that the mixer shaft 12 and the inner bearing housing 46 rotate together. A threaded nut 48 is provided to secure the inner bearing housing 46 on the mixer shaft 12. A threaded ring 49 is threaded on the inner bearing housing 46 to retain the bearing 34.

In a preferred embodiment, lubricating grease may be provided where appropriate to assist in lubricating the upper bearing 34 and/or the lower bearing 40 as desired. For example, a grease seal 50, a grease seal 52 and grease seal 54 may be provided to retain the grease around the upper bearing 34. Another grease seal 54 may be provided to retain grease around the lower bearing 40.

In the preferred embodiment, the upper bearing 34 is a tapered roller bearing canted in the angular direction illustrated (i.e., upwardly away from the mixer shaft 12). The lower bearing 40 in this embodiment is also a tapered roller bearing canted as illustrated (i.e., downwardly away from the mixer shaft 12). The feature of angling the roller bearings 34, 40 opposite to each other provides a significant improvement over the prior art, because the bearings 34, 40 can provide improved radial and axial load handling, and further can resist bending along the length of the shaft 12 between the bearings 34, 40. This in turn provides a desirable resistance against bending along the mixer shaft 12, particularly relatively near the bearing locations, for example, at the location of the lower seal 28.

In the illustrated preferred embodiment, the present invention provides resistance against axial, radial, and bending movement. The use of tapered roller bearings particularly enhances the axial restraining performance of the bearing arrangement. The tapered roller bearings also provide desirable lateral restraining ability. The provision of two sets of roller bearings, one spaced above the other in the axial direction along the mixer shaft 12, provides a restraining force at two different axial locations, thereby reacting to bending loads along the shaft. This restraining effect also tends to keep the mixer shaft 12 in a sufficiently linear condition at areas of the mixer shaft 12 relatively adjacent to the bearings. In this way, the arrangement of the bearings shown in the preferred embodiment of FIG. 1 improves the restraining ability of the bearing assembly in the area of the mixer shaft 12 near the seal 28 as well. This restraining effect can reduce wear on the seal, thereby improving seal lifetime, and providing a better sealing effect during the life of the seal. A flexible coupling 18 may be used as shown to accommodate any misalignments between the coupled shafts.

Figure 2:
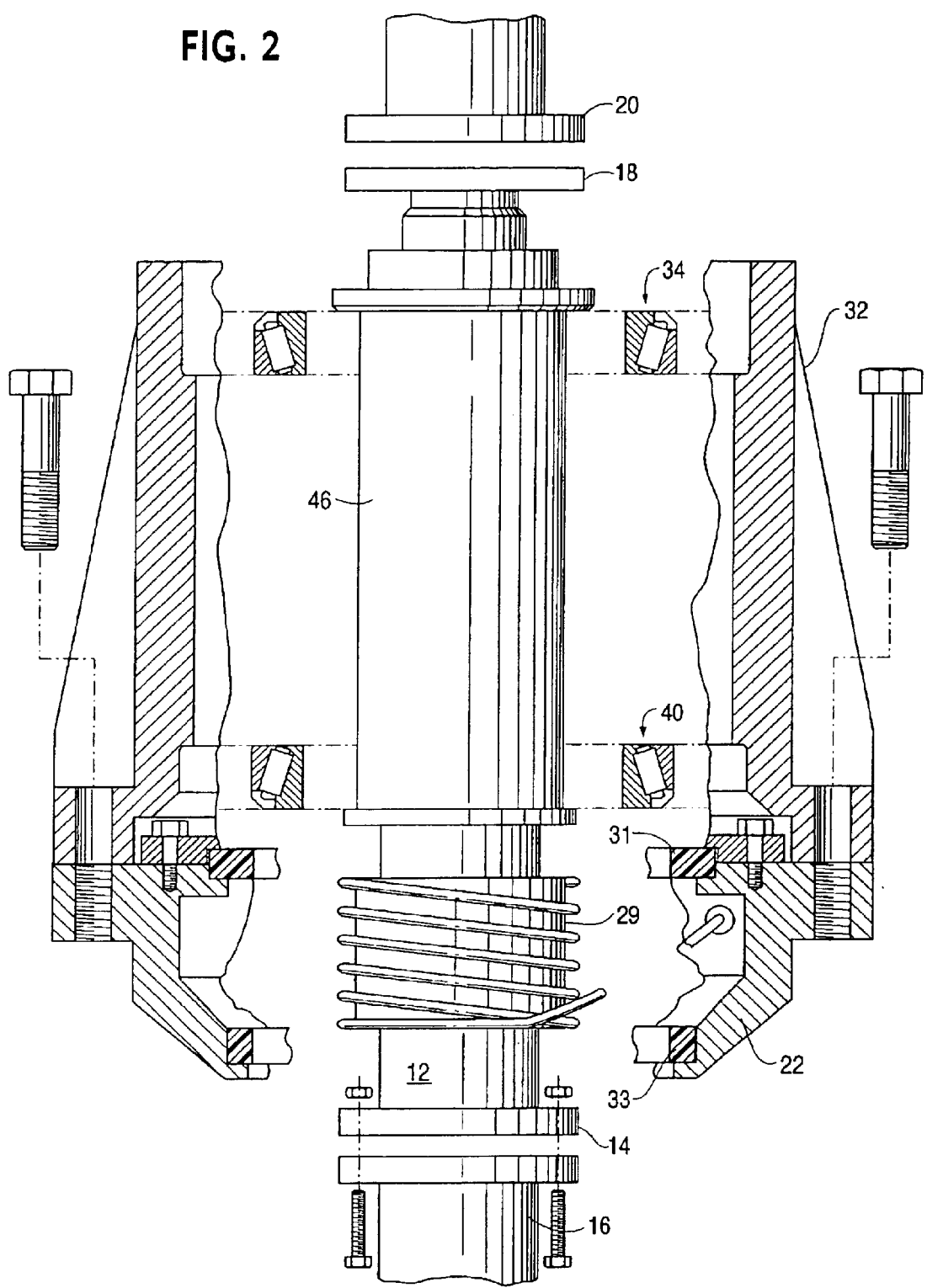
FIG. 2 is an exploded view of the assembly of FIG. 1.

FIG. 2 illustrates the above described components in exploded view, including the mixer shaft 12 having the lower flange 14 and the coupling 18. The seal housing base 22 and the seal housing top 26 that retain the seal element 28 are shown. Also shown is the outer bearing housing 32 which retains the upper bearing 34 and the lower bearing 40 against the and inner bearing housing 46 which surrounds a portion of the mixer shaft 12.

FIG. 3 schematically depicts a bearing and seal assembly 10 as illustrated in FIGS. 1 and 2 being installed in an opening of a top wall of a mixer vessel 8, with a drive system 50 having a drive shaft 20 connected to the top end of the mixer shaft 12. The lower end of the mixer shaft 12 is connected to an impeller shaft 16 that has impellers 52 mounted thereon. In a preferred embodiment, the drive system 50 is an electric motor and speed reducer.

From the description provided herein, it will be appreciated that a bearing and seal assembly is provided that can provide improved performance. A method is also provided by which a mixer shaft is supported so that a seal is provided around the mixer shaft, and radial, axial, and bending loads along at least a portion of the shaft are counteracted by the bearing assembly. More specifically, the above mentioned loads are counteracted by provision of two bearings located at different axial heights along the shaft. In a preferred embodiment, the two bearings may be tapered roller bearings, and may be canted at opposing angles to each other.

The invention also provides a method of supporting a mixer shaft as described above where the seal and bearing assembly 10 may be disconnected as a cartridge or unit from an internal impeller shaft and/or from a drive shaft providing driving force from a motor for removal from the mixer vessel 8. This provides for convenient repair and/or replacement of the seal and bearing assembly. As shown in FIG. 1, the cartridge includes the base 22, the seal assembly 28, the unitary inner and outer bearing housings 46, 32, and the first/upper and second/lower tapered roller bearings 34, 40.

In the preferred embodiment, the two bearings are both located on the same side of the seal, and preferably above the seal. However, in other embodiments the seal can be located in between the bearings or the bearings can both be located below the seal. Also, although tapered roller bearings are preferred, other suitable types of bearings may be employed in other embodiments.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An assembly for supporting a mixer shaft in an opening in a vessel wall, the assembly comprising:
    a base mounted to the vessel wall around the opening;
    a seal assembly mounted to the base at an axial location relative to the mixer shaft to seal against the mixer shaft;
    a unitary outer bearing housing mounted to the base without contacting the vessel wall;
    a unitary inner bearing housing mounted to the shaft to rotate with the shaft;
    a first tapered roller bearing canted at an angle to the shaft, said first tapered roller bearing having a first inner race supported on the unitary inner bearing housing and a first outer race supported on the unitary outer bearing housing;
    a second tapered roller bearing canted at an angle to the shaft, said second tapered roller bearing having a second inner race supported on the unitary inner bearing housing and a second outer race supported on the unitary outer bearing housing; and
    a threaded ring threadable onto the first inner bearing housing to contact with the first inner race of the first tapered roller bearing and to secure the first and second tapered roller bearings and the inner bearing housing and the outer bearing housing together as an assembly attached to each other,
    wherein the base, the seal assembly, the unitary inner and outer bearing housings, and the first and second tapered roller bearings together form a removable cartridge.

2. An assembly according to claim 1, further comprising a nut threadable onto the shaft at a location above the inner bearing housing to contact the inner bearing housing to secure the inner bearing housing onto the shaft, thereby securing the entire removable cartridge on the shaft.

3. An assembly according to claim 1, further comprising:
    a flange for mounting the base to the vessel wall.

4. An assembly for supporting a mixer shaft in an opening in a vessel wall, the assembly comprising:
    means for supporting the assembly mounted to the vessel wall around the opening;
    sealing means mounted to the supporting means at an axial location relative to the mixer shaft to seal against the mixer shaft;
    a unitary outer bearing housing mounted to the supporting means without contacting the vessel wall;
    a unitary inner bearing housing mounted to the shaft to rotate with the shaft;
    a first tapered roller bearing canted at an angle to the shaft, said first tapered roller bearing having a first inner race supported on the unitary inner bearing housing and a first outer race supported on the unitary outer bearing housing;
    a second tapered roller bearing canted at an angle to the shaft, said second tapered roller bearing having a second inner race supported on the unitary inner bearing housing and a second outer race supported on the unitary outer bearing housing; and
    a threaded ring threadable onto the inner bearing housing to contact with the first inner race of the first tapered roller bearing and to secure the first and second tapered roller bearings and the inner bearing housing and the outer bearing housing together as an assembly attached to each other,
    wherein the supporting means, the sealing means, the unitary inner and outer bearing housings, and the first and second tapered roller bearings together form a removable cartridge.

5. An assembly according to claim 4, further comprising a nut threadable onto the shaft at a location above the inner bearing housing to contact the inner bearing housing and to secure the inner bearing housing onto the shaft, thereby securing the entire removable cartridge on the shaft.

6. An assembly according to claim 5, further comprising:
    a flange for mounting the supporting means to the vessel wall.

7. An assembly for supporting a mixer shaft in an opening in a vessel wall, the assembly comprising:
    a base mounted to the vessel wall around the opening;
    a seal assembly mounted directly to the base at a first axial location relative to the mixer shaft to seal against the mixer shaft;
    a unitary outer bearing housing mounted directly to the base without contacting the vessel wall;
    a unitary inner bearing housing mounted to the shaft to rotate with the shaft;
    a first tapered roller bearing canted at a first angle to the shaft, said first tapered roller bearing having a first inner race supported on the unitary inner bearing housing at a second axial location and a first outer race supported on the unitary outer bearing housing;

a second tapered roller bearing canted at a second angle to the shaft, opposite to the first angle, said first tapered roller bearing having a second inner race supported on the unitary inner bearing housing at a third axial location spaced apart from the second axial location so the bearings are axially spaced apart from each other, and a second outer race supported on the unitary outer bearing housing; and a threaded ring threadable onto the first inner bearing housing to in contact with the first inner race of the first tapered roller bearing and to secure the first and second tapered roller bearings and the inner bearing housing and the outer bearing housing together as an assembly attached to each other, wherein the base, the seal assembly, the unitary inner and outer bearing housings, and the first and second tapered roller bearings together form a removable cartridge.

8. An assembly according to claim 7, further comprising a nut threadable onto the shaft at a location above the inner bearing housing to contact the inner bearing housing and to secure the inner bearing housing onto the shaft, thereby securing the entire removable cartridge on the shaft.

9. An assembly according to claim 7, further comprising:

a flange for mounting the base to the vessel wall.

\* \* \* \* \*